(12) United States Patent
Schelèn et al.

(10) Patent No.: US 7,734,796 B2
(45) Date of Patent: Jun. 8, 2010

(54) METHOD AND ARRANGEMENT FOR RESERVING RESOURCES TO OBTAIN A PREDETERMINED QUALITY OF SERVICE IN AN IP NETWORK

(75) Inventors: Olov Schelèn, Norrfjärden (SE); Joakim Norrgård, Luleå (SE); Jim Sundqvist, Luleå (SE)

(73) Assignee: Netsocket, Inc., Plano, TX (US)

( * ) Notice: Subject to any disclaimer, the term of this patent is extended or adjusted under 35 U.S.C. 154(b) by 1032 days.

(21) Appl. No.: 10/488,613

(22) PCT Filed: Aug. 22, 2002

(86) PCT No.: PCT/SE02/01490

§ 371 (c)(1),
(2), (4) Date: Mar. 4, 2004

(87) PCT Pub. No.: WO03/021888

PCT Pub. Date: Mar. 13, 2003

(65) Prior Publication Data

US 2004/0260796 A1    Dec. 23, 2004

Related U.S. Application Data

(60) Provisional application No. 60/316,298, filed on Sep. 4, 2001.

(30) Foreign Application Priority Data

Sep. 4, 2001    (SE) .................................. 01029297

(51) Int. Cl.
*G06F 15/16*    (2006.01)

(52) U.S. Cl. ...................................................... 709/229
(58) Field of Classification Search .............. 370/395.2, 370/395.21; 709/226–229
See application file for complete search history.

(56) References Cited

U.S. PATENT DOCUMENTS

| | | | |
|---|---|---|---|
| 6,714,515 B1* | 3/2004 | Marchand .................... | 709/226 |
| 2001/0027484 A1* | 10/2001 | Nishi .......................... | 709/223 |
| 2002/0087699 A1* | 7/2002 | Karagiannis et al. ........ | 709/227 |

OTHER PUBLICATIONS

Sander et al. "End-to-end Provision of Policy Information for Network QoS" 10th IEEE Symposium on HPDC Aug. 2001.*

"QBone Bandwidth Broker Architecture" http://qbone.internet2.edu/bb/bboutline2.html Apr. 13, 2001.*

Schelén et al., "Performance of QoS Agents for Povisioning Network Resources", Computer Science and Electrical Engineering, Luleå University of Technology, SE, pp. 17-26, 1999.

(Continued)

*Primary Examiner*—Larry Donaghue
(74) *Attorney, Agent, or Firm*—Slater & Matsil, L.L.P.

(57) ABSTRACT

A method and an arrangement in an IP network provides a scalable solution for reserving resources to obtain a predictable QoS end-to-end in a heterogeneous IP network. The object is achieved by categorizing the destination domain with a domain property label that for example informs about the availability of resources in the destination domain and about how to obtain QoS to the endpoint in this particular domain category.

42 Claims, 4 Drawing Sheets

OTHER PUBLICATIONS

Schelén et al., "An Agent-based Architecture for Advance Reservations", Computer Science and Electrical Engineering, Luleå University of Technology, SE, pp. 451-459, 1997.

Borg et al., "Efficient Multi-field Packet Classification for QoS Purposes", Telia Research AB / Computer Science and Electrical Engineering, Luleå University of Technology, SE, pp. 109-118, 1999.

Schelén et al., "Resource sharing in advance reservation agents", Computer Science and Electrical Engineering, Luleå University of Technology, SE, pp. 1-17, 1998.

* cited by examiner

METHOD AND ARRANGEMENT FOR RESERVING RESOURCES TO OBTAIN A PREDETERMINED QUALITY OF SERVICE IN AN IP NETWORK

FIELD OF INVENTION

The present invention relates to a method and an arrangement in an IP network. In particular, it relates to reserving resources to obtain a predetermined Quality of Service (QoS) end-to end for a certain stream of IP packets.

BACKGROUND OF THE INVENTION

The Internet is based on the Internet Protocols (IP) as standardised by the IETF. Some initial objectives with the IP protocols were to interconnect different kinds of physical networks into one large virtual network and to provide a uniform platform for supporting a large range of applications. Some technical reasons for the tremendous success in reaching these objectives are:
  Stateless packet forwarding: IP datagram forwarding is stateless with respect to application data streams. Forwarding is performed according to a table of destination address prefixes.
  Dynamic and scalable routing: Routes are set up by distributed and dynamic intra- and inter-domain routing protocols such as Open Shortest Path First (OSPF) and Border Gateway Protocol (BGP). These routing protocols automatically detect network failures and set up new routes to avoid failure. Inter-domain routing scales well due to aggregation of network address prefixes into destination rooted sink tree.

The IP is designed to be used in networks where different traffic flows share network resources equally. This means that the received QoS depends on the current load in the network.

Currently, the Internet becomes more heterogeneous, both in terms of link technologies ranging from fiber optics to wireless, in terms of application service demands ranging from real-time interactive to asynchronous bulk data transfer, and in terms of user demands ranging from business critical use to unstructured home entertainment. This development drives the need for service differentiation in the network. A requirement on QoS mechanisms is that they should be developed according to the basic principles of stateless packet forwarding and scalable aggregation as described above.

The state of the art of QoS in IP networks is described below:

Integrated Service (IntServ)/Resource ReSerVation Protocol (RSVP)

The IntServ architecture and RSVP is a signalled architecture to provide end-to-end QoS guarantees for individual application data streams. The solution provides fine granular service guarantees at the price of per flow state complex packet classification in routers along the path.

For RSVP, there are proposals for setting up aggregated tunnels between an aggregator and a de-aggregator. While this is more scalable, it is still a model where aggregated tunnels are established between pairs of edge routers. These edge routers suffer from at least the same complexity as standard IntServ/RSVP routers. For network policy management, RSVP relies on policy servers.

Differentiated Service (DiffServ)

DiffServ architecture standardises router support for class-based forwarding. DiffServ forwarding in core routers is stateless with respect to application data streams. Traffic conditioners at domain boundaries are used to guard a domain against overload.

The problem of DiffServ is to meet QoS demands for a large range of applications. Resources (bandwidth) for the various traffic classes can be provisioned semi-statically, dimensioned according to expected service characteristics and assumed usage statistics. However, to provide predictable service levels through provisioning only, resources must be over provisioned. This may be possible in homogeneous networks with homogeneous applications and user demands. In real networks where links with vastly different characteristics are interconnected (e.g. fiber optic access and wireless access) and applications/users with various demands over provisioning at all hops is a huge challenge.

To provide predictable services in a heterogeneous environment, DiffServ must rely on dynamic Network Resource Management (NRM) to control the service quality and the usage of provisioned resources. To meet scalability demands, resource management should support aggregation of resource requests.

Multi-Protocol Label Switching (MPLS)

MPLS is a method that extends traditional IP network layer routing and control protocols with label-switched forwarding. MPLS provides connection-oriented switching in IP networks. Labels are associated with specific streams of data (known as Forwarding Equivalence Classes (FEC)). The labels and their FEC bindings are distributed across the network, the MPLS domain, to establish a label switched path. Entering the domain, packets are assigned one or more labels (a stack of labels). Passing through the domain, packets are forwarded based on labels. MPLS can be used to provide QoS by allocating resources to specific label switched paths. MPLS operates only within individual label switched domains. Inter-domain resource reservations are currently not supported.

All methods described above need additional support for inter-domain resource provisioning. This can be provided by a server-based architecture. For RSVP, an architecture of policy servers has been suggested. For DiffServ, QoS agents and bandwidth brokers have been suggested. For MPLS, QoS agents that understand the semantics of MPLS could be used.

In Schelen, O. *Quality of Service Agents in the Internet*, Doctoral Thesis, Department of Computer Science and Electrical Engineering, Division of Computer Communication, Luleå University of Technology, Luleå, 1998, a Network Resource Manager (NRM) is introduced. An NRM can provide inter-domain resource provisioning and call admission control, either independently of the mechanism described above or in co-operation with them. Among these, the combination of differentiated forwarding and NRM operates along the fundamental lines of stateless forwarding and inter-domain aggregation as described. The NRM has path-sensitive admission control, scheduling of resources over time, capability to handle resource requests for immediate and future use, resource signalling between resource manager entities (i.e. inter-domain communication) and aggregation of resource requests towards a destination domain identified by an address prefix. The NRM is aware of topology and characteristics of the network and can thus keep track of resources that exist in a routing domain based on topology. For each domain in the network there is an NRM responsible for admission control. Instances of NRM can perform admission control in its own domain and reserve resources with neighbouring NRMs for other destinations. The NRM can therefore provide a predictable QoS.

Figure 1:
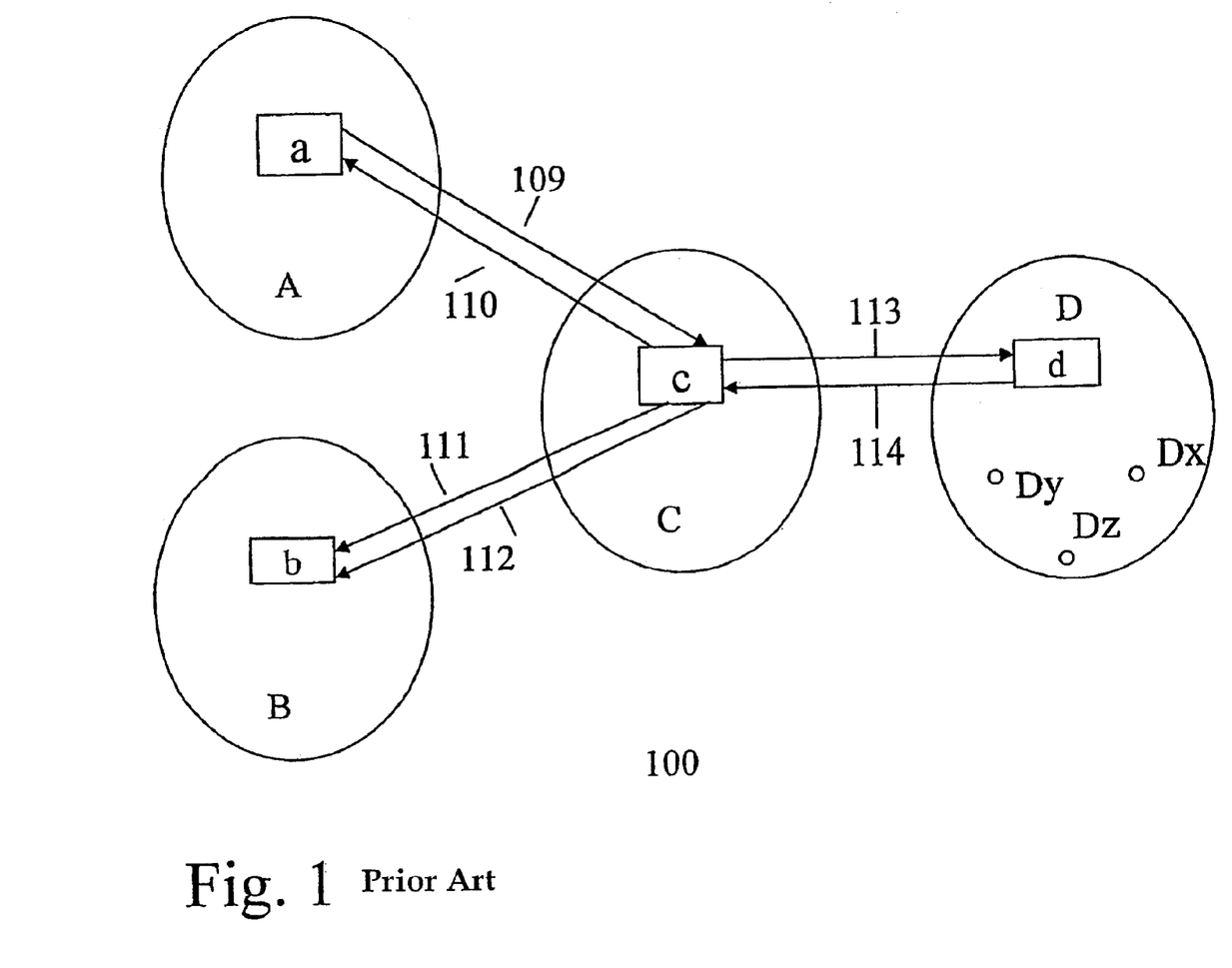
FIG. 1 shows an example of prior art where resource requests are aggregated towards the destination domain by using the funnel concept.

The funnel concept is also introduced in Schelen. The funnel concept is a scalable model for aggregation of resource requests. The funnel concept uses NRMs, and NRMs ask for resources from other NRMs. Reservations from different sources to the same destination are aggregated where they merge along the paths so each NRM has at most one reservation per destination domain with their neighbouring agents. An NRM in charge of the domain where the destination point is located can generalize received reservation requests for that point to cover any endpoint in its domain. FIG. 1 shows how resource requests are aggregated towards the destination domain. FIG. 1 is a network 100 comprising 4 domains A, B, C and D. Each domain has an NRM a, b, c, d. Dx, Dy and Dz may be a subnetwork or a base station controller in a wireless access network. The NRM a and the NRM b need resources in domain D; the NRM a to Dy and the NRM b to Dx. Thanks to that the NRMs are aware of the network topology they know that the packets have to be transmitted through domain C. In this example, the NRM a transmits 109 a request of 20 resource units to the NRM c and the NRM b transmits 111 a request of 10 resource units to the NRM c. The NRM c needs 10 resource units in domain D for its own domain and sends therefore a request to the NRM d for 40 resource units. Then the NRM d transmits 114 a confirmation to the NRM c that 40 resource units are reserved in domain D and the NRM c further transmits 110 one confirmation to the NRM a and transmits 112 one confirmation to NRMb. Packets using a reservation are marked by applications or edge routers and checked and/or remarked by police points. This is to ensure that packets only with allowed QoS-class utilize the reserved path.

In the funnel concept, it is assumed that the destination domain is well provisioned or another mechanism is used to ensure QoS in the destination domain. In large networks, it would not be preferable to use the above described funnel concept all the way to the endpoint, since that would not be scalable enough. Instead, funnels are used to reach a destination domain (e.g., a subnet) of suitable size. No resources are reserved for the final part of the path within the destination domain. Therefore, the funnel concept cannot by itself provide end-to-end, i.e. from a source endpoint to a destination endpoint, QoS if the destination domain is under-provisioned. However, there exist destinations that are not connected to a well-provisioned destination domain. One example on such a domain is a wireless access network, where the last hop, i.e. between the base station and the terminal is a bottleneck link. Another problem arises when the hosts are mobile terminals. The QoS mechanisms must allow quick local re-computation of QoS at handover between base stations in a wireless access networks.

SUMMARY

The objective problem is to provide a scalable solution for reserving resources to obtain a predictable QoS end-to-end in a heterogeneous IP network.

The method implemented in the IP network provided by the present invention comprising the steps of:
- a second NRM announcing a domain property label of a destination to the first NRM;
- the first NRM and the second NRM respective performing appropriate actions for transmitting IP packets with a predetermined QoS between a source terminal and a destination terminal, according to the announced domain property label, makes it possible to reserve resources in order to obtain a predictable QoS end-to-end in a heterogeneous IP network.

An IP network, wherein the second NRM comprises means for announcing a domain property label of the destination domain to a first NRM, and wherein the first NRM and the second NRM respective comprise means for performing an appropriate action, for transmitting IP packets with a predetermined QoS between a source terminal and a destination terminal, according to the announced domain property label, makes it possible to reserve resources in order to obtain a predictable QoS end-to-end in a heterogeneous IP network.

An advantage with the present invention is that the NRM path vector works as a tool for identifying NRMs in requested destination domain and NRMs along the path.

Another advantage with the present invention is that the NRM path vector provides a tool for detecting denials and failures along the path towards the endpoint.

Yet another advantage is that present invention provides a tool to distinguish between destination domains with different characteristics.

Yet another advantage is that the present invention can utilize the scalable properties of the funnel model in networks with under provisioned destination domains.

DETAILED DESCRIPTION OF THE INVENTION

Figure 2:
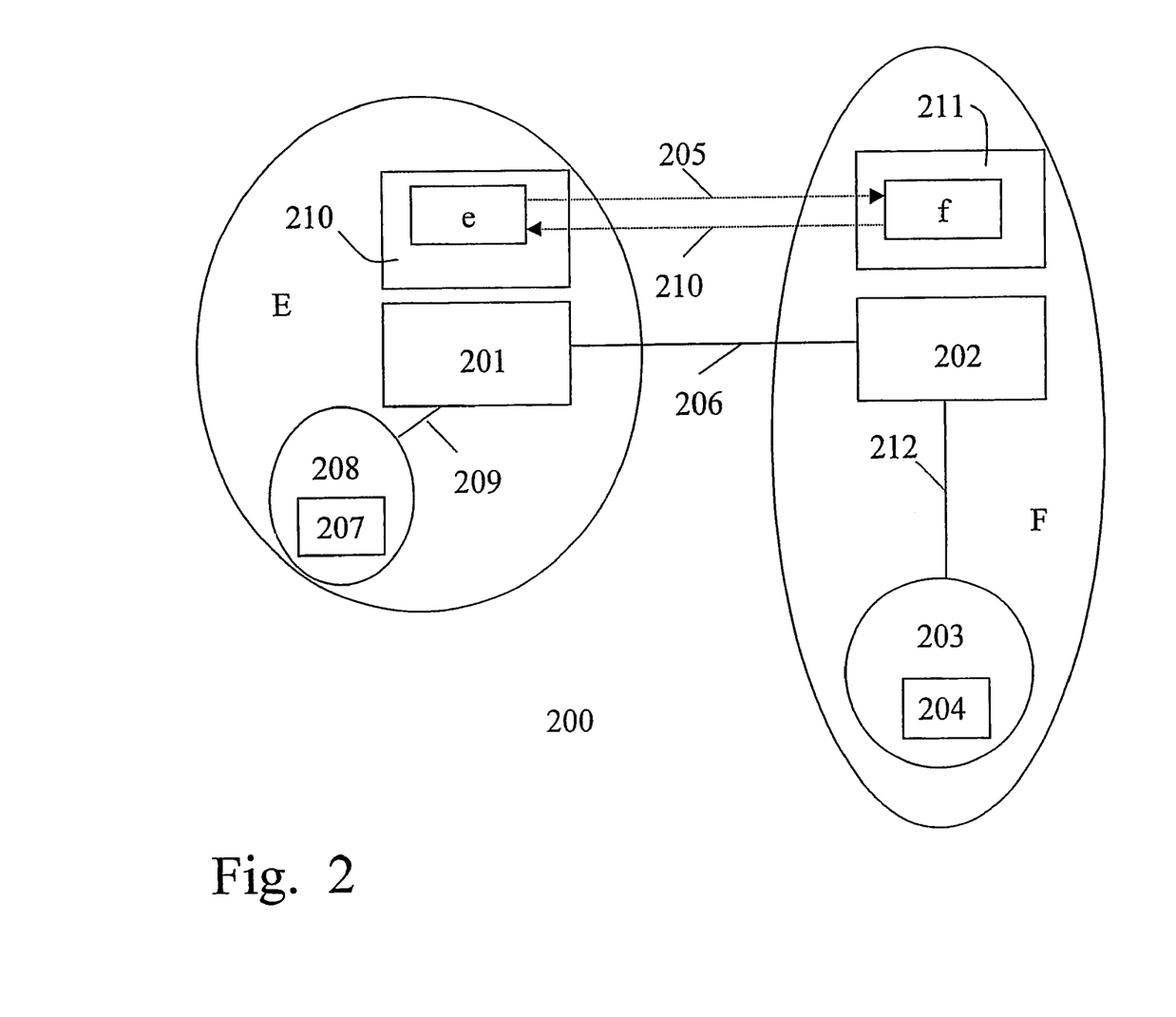
FIG. 2 shows a network comprising two domains according to the present invention.

FIG. 2 shows an IP network 200 according to a first embodiment of the present invention. The network 200 comprises a first domain E and a second domain F. A domain is a logic part of an IP network and the division is done for administrative reasons. A domain is in the present invention referring to a routing domain.

Domain E comprises a router 201, a Network Resource Manager (NRM) e, a server 210 and a subnetwork 208 comprising a terminal 207. In the example described in FIG. 2, the domain E may be a source domain. Or the source domain may be a third domain that transmits packets through domain E in order to reach a destination domain F. The domain, wherein the terminal of the sender is located, is referred to as the source domain.

The destination domain F and comprises a server 211, a router 202, an NRM f, a subnetwork 203 and an endpoint within one of the subnetworks 203. A domain wherein the endpoints are located is referred to as the destination domain.

Each subnetwork 203, 208 further comprises at least one terminal 204, 207. Each terminal 204 is assigned a dynamic or static IP address by the subnetwork 203, 208. The terminal 204, whereto the packets are intended to be sent, is referred to as an endpoint. The subnetwork 203, 208 may exemplary be a LAN, comprising at least one gateway, at least one server and at least one terminal, or a wireless network, comprising at least one Radio Network Controller (RNC), at least one Base Station (BS) and at least one mobile terminal. The terminal

204, 207 may preferable be a PC or an IP telephone in a wireline network or a mobile phone or a laptop in a wireless network.

The routers 201, 202 respective interconnect 206, 212, 209 different networks 203, 208 e.g. different LANs comprising terminals. An NRM e,f comprises of a computer program for e.g. reserving resources and may e.g. be implemented in a respective server 210, 211 or alternatively in a respective router 201, 202. A server is substantially a device for storing and computing data while the router is mainly routing IP packets.

The NRM has the features as described above under "Background of the invention" e.g. performing admission control and inter-domain communication 205, 210 and aggregation of resource requests by using the funnel concept all the way to the NRM in the destination domain. The NRMs are further responsible for destination address prefix aggregation by announcing appropriate destination address prefix and according to the present invention label those destinations with a domain property label. By categorising each domain with a domain property label, it is possible to separate between domains with different characteristics such as availability of resources e.g. bandwidth. The domain property label comprises information about what method to use in this domain, in order to obtain QoS to an endpoint within the domain. The funnel concept works well for reserving resources in a scalable manner all the way to the NRM in the destination domain, but what remains is the way from the NRM to the endpoint within the destination domain. Therefore, it is the properties, i.e. domain property label of the destination domain that is of special interest. An NRM f within a destination domain F that has received a resource request transmits a confirmation message (provided that the request is granted) to NRMs e and in some cases other units, involved in the request. The confirmation message informs that a certain amount of resources are reserved so a requested QoS can be fulfilled to the destination NRM F. The domain property label is added in the confirmation message or may be sent in a separate message. By reading the domain property label, the NRMs and in some cases said other units involved in the request are informed whether they are required to reserve resources or not. If resources have to be reserved due to that the destination domain is under provisioned, the domain property label tells how the resource reservation should be handled.

Domain Property Label

The domain property label is defined, in a domain property label field. The label field may e.g. comprise of 16 bits and may be a part of the data transmitted between the NRMs. The label field allows a large number of domain property labels to be defined. The NRMs communicate with an application protocol over Transmission Control Protocol (TCP), and the application protocol defines the domain property label field. The information is routed the normal way and there can be resources pre-reserved for the transmission of the domain property label. Definitions of four types of property labels are given below:

The domain property label "Provisioned" provides the information that the domain is well-provisioned of resources and no reservations of resources are required to provide QoS to the endpoint within the domain. This appears e.g. in well-provisioned Local Area Networks (LANs). No action is required by the requesting units such e.g. a terminal 207 or an NRM e.

The domain property label "Catered" provides the information that the domain handles QoS set-up locally through an NRM called by e.g. the endpoint, a proxy or a Radio Network Controller (RNC). In the case where the endpoint is located within a radio access network, where resources are handled by a Radio Network Controller (RNC) in co-operation with a local IP resource manager, the RNC negotiates with a local NRM for resources. The RNC controls the terminal (end-point) and is aware of when the terminal requests a service that demands QoS end-to-end.

The domain property label "Requested" provides the information that the domain handles QoS through an NRM that can be called by a requesting unit e.g., sending terminal 207, an NRM e or a proxy, to extend QoS to a particular endpoint from the NRM. The address of the NRM is known through a NRM path vector. The NRM path vector is further described below in "NRM path vector".

The domain property label "Signalled" provides the information that the QoS within the domain is handled by signalling. The sending entity is transmitting "Resource ReSerVation Protocol (RSVP) path" messages within the data to allow the receiving terminal 204 to request QoS in the destination domain, and the receiving entity is transmitting "RSVP resv" messages. This implies that the sending entities (and the receiving) have to be located along the path of the traffic, as terminal 207. However, the NRM e is not able to send these RSVP messages but has to tell router 201 that the messages should be transmitted via a proxy to the destination.

The four domain property labels described above are given in order to make it possible to distinguish between destination domain with different characteristics. Although, other domain property labels may be defined and used in relation with the method described.

NRM Path Vector

A Network Resource Manager (NRM) path vector is introduced according to the present invention to allow identification of network resource managers along the path to a destination. For each funnel towards a given destination, the NRM path vector tells the sequence of NRMs that have granted the resources. The NRM path vector is a tool for identifying NRMs in requested destination domains. Denials and failures may also be detected by the NRM path vector, e.g., if a request is denied the path vector shows where denial occurred, or if an NRM is inaccessible said path vector shows where the problems are located. The NRM path vector is used for the label requested. However, the NRM path vector may be used for the labels signalled, provisioned, and catered in order to identify NRMs.

Figure 3:
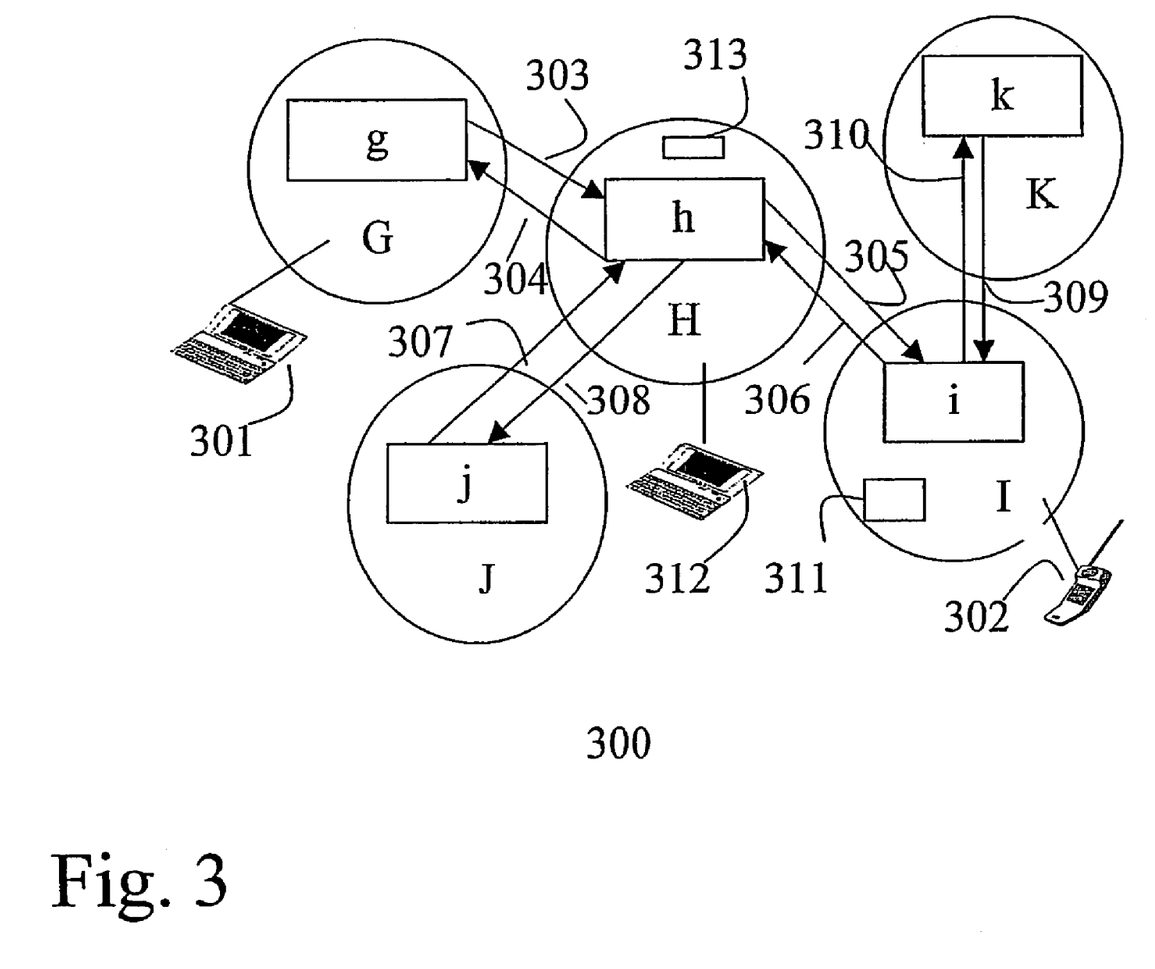
FIG. 3 discloses an example of inter-domain resource reservation according to the present invention.

An IP network 300 according to a second embodiment of the invention is disclosed in FIG. 3. The IP network 300 comprises five routing domains G, H, I, J, K, wherein one domain G is a source domain and one domain I is the destination domain. The source domain G comprises an NRM g and an endpoint constituting a terminal 301 and the destination domain I comprises an NRM i, a destination unit 311 and an endpoint 302. Further, the intermediate domain H comprises an NRM h, an endpoint 312 and a device 313, the domain J comprises an NRM j and the domain K comprises an NRM k. Each NRM can communicate with other NRMs within other domains and with the endpoints.

Referring to FIG. 3, the terminal 301 wants to send IP packets, requiring a predetermined QoS, to terminal 302. According to the topology of the network in this example, the IP packets require to pass by the domain H to reach the domain I. In order to fulfil the requested QoS, resources, in this example ten units, are reserved from terminal 310 to the endpoint (terminal 302) in the destination domain I. (More resources than what is necessary, to fulfil the requested QoS, may also be requested.) The amount of resources may be measured in bandwidth and/or requirements on delay and/or jitter. The following steps are performed:

The terminal 301 first requests ten units from the NRM g and then the NRM g requests 303 ten units to the endpoint 302 from the NRM h.

This second request is aggregated with other requests from other domains e.g. the domain J sends a request 307 for five units to an endpoint located in the domain K, that has data to send which also have to pass through the domain H and have its destination in the domain I or beyond, e.g. the domain K. Each NRM comprises only one or a few reservations per destination domain. For example, the QoS may be divided into different classes in terms of e.g. delay, bitrate, etc. Thus, it could be one reservation per destination domain and per QoS-class.

Subsequently, the NRM g requests 303 resource from the adjacent NRM h, two different methods for reserving resources all the way to the NRM i can be used. "Alt. 1" is used when the NRM h has pre-reserved resources to the domain I and "alt 2" is used when the NRM h has no pre-reserved resources to the domain I.

Alt 1: In most operations, resources may be granted all the way to the destination domain at a first NRM, since an NRM may perform pre-reservations of resources according to target over-allocations and heuristics for demands over time e.g., time of day and day of week. A request would thus be granted immediately by a first NRM h for resources all the way to the NRM i in the destination domain.

A confirmation message is sent 304 by the adjacent NRM after each resource-negotiation e.g., from the NRM h to the NRM g and from the NRM h to the NRM j 308.

the NRM h and the NRM i add their own identities e.g., their IP addresses, to an NRM path vector in order to update the vector.

The NRM path vector is included in the confirmation message.

The NRM h announces the domain property label of the domain I to the NRM g. The NRM h received the domain property label of the domain I when the pre-reservation of resources to the domain I was performed.

The terminal 301 is given the announced domain property label from the NRM g and a confirmation that resources are reserved to the domain I.

Alt 2: In some cases, when no pre-reservations are performed a request 303 would result in a chain of requests between adjacent NRM to setup resources. Then, confirmations are propagated back towards the origin. A confirmation means that resources are available to the destination domain as indicated in the confirmation message.

NRM h requests 305 five plus ten units from NRM i.

NRM i receives the request and notices that the destination is located in its domain.

A confirmation message is sent 306 by NRM i to NRM h, where NRM i responds that 15 units are reserved to h.

NRM i is added in the NRM path vector and the vector is sent in the confirmation message 306.

NRM i announces the domain property label of domain I to NRM h.

A confirmation message is sent 304 by NRM h to NRM g, where NRM h responds that 10 units are reserved to g.

NRM h adds its own identity to the NRM path vector, that now contains the identity of NRM i and NRM h. The vector is included in the confirmation message 304.

NRM h announces the domain property label to NRM g.

Terminal 301 is given the announced domain property label from NRM g and a confirmation that resources are reserved to domain I.

When alt 1 or alt 2 is performed appropriate actions are performed according to the announced domain property label.

If The Domain Property Label is Provisioned:

No resources are reserved in the destination domain.

The IP packets are routed according to conventional routing protocols to the end-point 302 on unreserved paths.

If The Domain Property Label is Catered:

The destination domain I handles QoS set-up locally through an NRM i.

A destination unit 311, which may e.g. be the end-point, a proxy or preferably a Radio Network Controller (RNC) in a wireless network is calling the NRM i within the destination domain. (The RNC controls the radio resources of the end-terminal).

The destination unit 311 negotiates with the destination NRM for the requested resources. Each destination unit 311 must recognise its most local NRM. That can be done with configuring each destination unit 311.

If The Domain Property Label is Requested:

A requesting unit, e.g. an endpoint 301, proxy or the NRM g, wherefrom the IP packets origin, is calling the NRM i. QoS is then handled through the NRM i to further extend QoS to a particular end-point 302. The address of the NRM i is known by the requesting unit through the NRM path vector.

If The Domain Property Label is Signalled:

The sender 301 is transmitting a "RSVP path" message to allow the receiver 302 to request QoS to the endpoint 302.

The receiver is then transmitting a "RSVP resv" message to reserve resources in the destination domain I.

Figure 4:
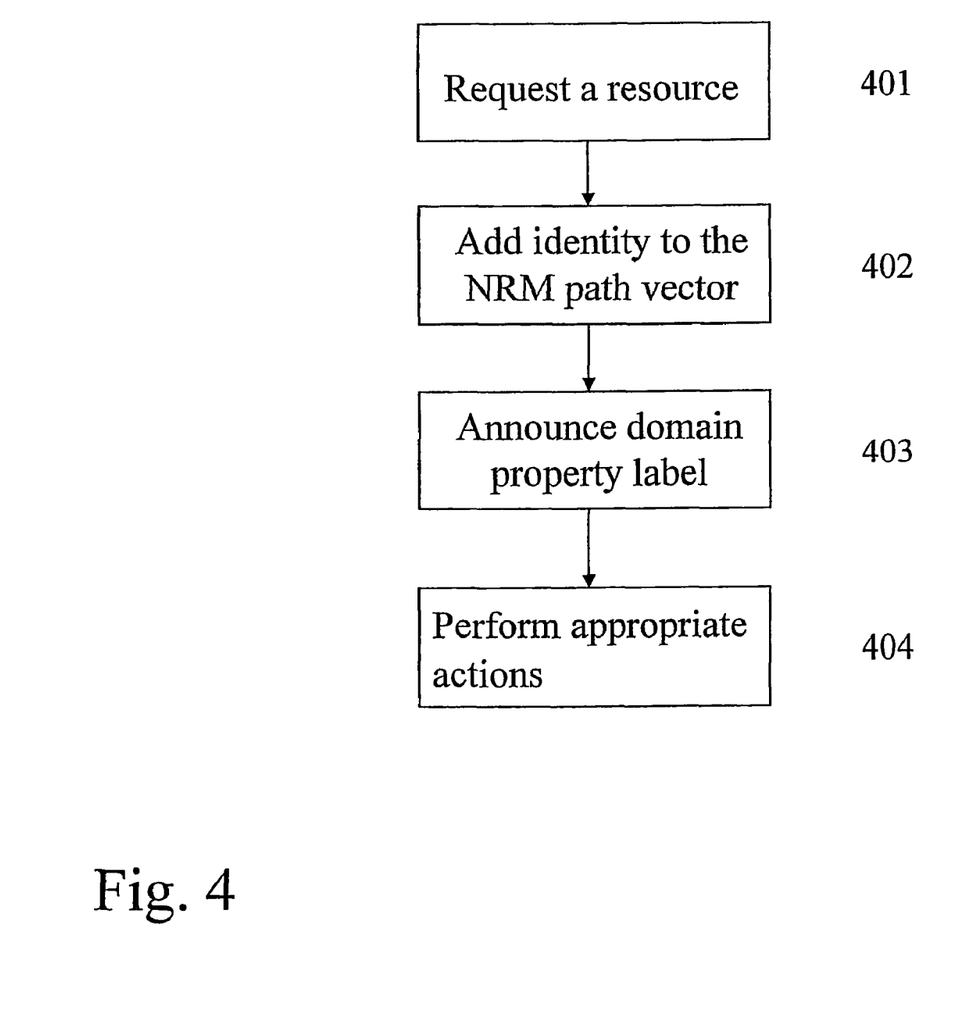
FIG. 4 depicts a sequence diagram of the resource reservation according to the present invention.

FIG. 4 shows a flowchart of a method according to the invention in a general mode. The method is performed in an IP network and is intended for transmission of IP packets from a source terminal, located in a source domain, to a destination terminal, located in a destination domain, wherein the source domain and the destination domain respective comprise an NRM. The method comprises the following steps:

401. A first NRM e located within said source domain E requests a resource, from a second NRM f located within said destination domain F.

402. NRM f adds its identity to the NRM path vector in order to update the vector.

403. NRM f announces a domain property label of the destination domain F to the first NRM e.

404. NRM e and NRM f perform an appropriate action for transmitting IP packets with a predetermined end-to-end QoS.

The method is implemented by means of a computer program product comprising the software code means for performing the steps of the method. The computer program product is run on processing means in a server or a router. The computer program is loaded directly or from a computer usable medium, such as a floppy disc, a CD, etc., or from transmission media such as the Internet, etc.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. An IP network, including a plurality of domains, comprising:
   a source domain and a destination domain, the source domain comprising a source terminal and a first Network Resource Manager (NRM), the destination domain comprising a destination terminal and a second NRM, the source domain and the destination domain having one or more intermediate domains communicatively coupled between the source domain and the destination domain;
   the source terminal in the source domain comprising means for sending IP packets requiring a predetermined QoS to the destination terminal;
   the first NRM in the source domain comprising means for requesting from the second NRM a resource sufficient for the transmission of the IP packets to be able to fulfill said QoS;
   the second NRM comprising means for announcing a domain property label of the destination domain to the first NRM, said domain property label characterizing said destination domain, the first NRM and the second NRM further comprising means for performing an appropriate action and for transmitting the IP packets with said QoS between the source terminal and the destination terminal according to the announced domain property label, said domain property label indicating to the first NRM when additional action is required to reserve resources in the destination domain; and
   means for using an NRM path vector to identify said second NRM.

2. The IP network according to claim 1, wherein the IP packets from said source domain are transmitted to said destination domain via one intermediate domain;
   said intermediate domain comprising at least one NRM adapted for inter-domain communication with an NRM within an adjacent domain.

3. The IP network according to claim 1, further comprising means for using the NRM path vector to identify other NRMs along a path from the source terminal to the destination terminal.

4. The IP network according to claim 1, further comprising means for using NRM path vector to detect denials and/or failures along a path, from the source terminal to the destination terminal.

5. The IP network according to claim 1, wherein the second NRM comprises means for adding the second NRM's identity to the NRM path vector.

6. The IP network according to claim 1, wherein the second NRM comprises means for sending a message to an adjacent NRM, said message comprising the NRM path vector.

7. The IP network according to claim 1, wherein the first and second NRM comprise means for aggregating said resource request with other requests from another domain.

8. The IP network according to claim 1, wherein said announced domain property label is provisioned; the means for performing an appropriate action comprising means for transmitting IP packets on unreserved resources.

9. The IP network according to claim 1, wherein said announced domain property label is catered; the means for performing an appropriate action comprising a device in the destination domain that further comprises means for calling an NRM in the destination domain to ensure QoS to the destination terminal.

10. The IP network according to claim 9, wherein said device is a Radio Network Controller (RNC) and the destination terminal is a mobile terminal.

11. The IP network according to claim 1, wherein said announced domain property label is requested; the means for performing an appropriate action comprising a requesting device that further comprises means for calling another NRM, and the other NRM comprising means for extending resource reservations from said requesting device to the destination terminal.

12. The IP network according to claim 11, wherein the requesting device is the source terminal or another NRM.

13. The IP network according to claim 11, wherein the IP network comprises means for using the NRM path vector for identifying an address of said other NRM.

14. The IP network according to claim 1, wherein said announced domain property label is signaled; the means for performing an appropriate action comprising the source terminal and further comprising means for transmitting "Resource ReSerVation Protocol (RSVP) path" messages to the destination terminal and the destination terminal further comprising means for transmitting "RSVP resv" messages in order to reserve resources within the destination domain.

15. A Network Resource Manager (NRM) unit within a first domain within an IP network, the NRM unit comprising:
   means for receiving a resource request from a second NRM, located within a second domain, the first domain being separated from the second domain by one or more intermediate domains;
   said NRM unit comprising means for announcing a domain property label of the first domain to the second NRM, said domain property label characterizing a destination domain and indicating to the second NRM when additional action is required to reserve resources in the first domain;
   means for performing an appropriate action, to provide a QoS end-to-end, between a first endpoint and a second endpoint, according to the announced domain property label; and
   means for using an NRM path vector to identify a third NRM within a third domain.

16. The NRM unit according to claim 15, further comprising means for using the NRM path vector to detect denials and/or failures along a path, between the first endpoint and a third endpoint.

17. The NRM unit according to claim 15, further comprising means for adding the NRM unit's identity into the NRM path vector.

18. The NRM unit according to claim 15, further comprising means for sending a message to the second NRM, said message comprising the NRM path vector.

19. The NRM unit according to claim 15, further comprising means for aggregating said resource request with other requests from another domain.

20. The NRM unit according to claim 15, wherein said announced domain property label is catered, and wherein the means for performing an appropriate action comprises means for receiving a call from a device within the first domain, wherein the call further comprises a request to said NRM unit to ensure QoS to the second endpoint.

21. The NRM unit according to claim 20, wherein said device is a Radio Network Controller (RNC) and the second endpoint is a mobile terminal.

22. The NRM unit according to claim 15, wherein said announced domain property label is requested, and wherein the means for performing an appropriate action comprises means for receiving a call from a requesting device and extending resource reservations from the NRM unit to a particular endpoint.

23. The NRM unit according to claim 22, wherein the requesting device is an endpoint within the first domain or another NRM.

24. The NRM unit according to claim 22, further comprising means for having the NRM unit's address identified by the NRM path vector.

25. A method for reserving resources within an IP network to obtain a predetermined QoS between a source terminal within a source domain and a destination terminal within a destination domain, the method comprising the steps of:
   a first Network Resource Manager (NRM), located within said source domain, requesting from a second NRM, located within said destination domain, a resource required for fulfilling said QoS, said resource being intended for transmission of IP packets, one or more intermediate domains being interposed between the source domain and the destination domain;
   the second NRM announcing a domain property label of the destination domain to the first NRM, said domain property label characterizing said destination domain;
   the first NRM and the second NRM performing one of several actions for transmitting said IP packets with said QoS between the source terminal and the destination terminal according to the announced domain property label, at least one of the several actions causing the first NRM to perform additional communications with the second NRM to reserve resources in said destination domain; and
   using an NRM path vector to identify NRMs along a path from the source terminal to an end-terminal.

26. The method according to claim 25, wherein the IP packets from said source domain are transmitted to said destination domain via a third domain;
   said third domain comprising at least one NRM adapted for inter-domain communication with an NRM within an adjacent domain.

27. The method according to claim 25, comprising the further step of:
   using a second NRM path vector to identify NRMs within the destination domain.

28. The method according to claim 25, comprising the further step of:
   using the NRM path vector to detect denials and/or failures along a path, from the source terminal to the end-terminal.

29. The method according to claim 25, comprising the further step of:
   adding an identity of the first and second NRM to the NRM path vector.

30. The method according to claim 29, comprising the further steps of:
   sending a message to an adjacent NRM, and
   including said NRM path vector in the message.

31. The method according to claim 25, comprising the further step of:
   aggregating said resource request with other requests from another domain within the IP network.

32. The method according to claim 25, wherein said announced domain property label is provisioned; an appropriate action comprising the step of:
   transmitting the IP packets on unreserved resources.

33. The method according to claim 25, wherein said announced domain property label is catered; an appropriate action comprising the step of:
   calling the second NRM within the destination domain to ensure QoS to the destination terminal.

34. The method according to claim 33, wherein a Radio Network Controller (RNC) is calling said second NRM within the destination domain to ensure QoS to the destination terminal and the destination terminal being a mobile terminal.

35. The method according to claim 25, wherein said announced domain property label is requested; an appropriate action comprising the step of:
   calling another NRM that extends resource reservations from said other NRM to the destination terminal.

36. The method according to claim 35, wherein the source terminal or yet another NRM is calling said other NRM.

37. The method according to claim 35, comprising the further step of:
   using the NRM path vector for identifying an address of said other NRM.

38. The method according to claim 25, wherein said announced domain property label is signaled; an appropriate action comprising the steps of:
   the source terminal transmitting "Resource ReSerVation Protocol (RSVP) path" messages to the destination terminal in the destination domain; and
   the destination terminal transmitting "RSVP resv" messages in order to reserve resources within the destination domain.

39. A computer readable storage medium encoded with a computer program product directly loadable into a processing means within a server and/or a router in an IP network, comprising the software code means for performing the steps of claim 25.

40. The computer readable storage medium encoded with a computer program product directly loadable into a processing means within a server and/or a router in an IP network according to claim 39, wherein the processing means are also located within a Radio Network Controller, proxy, or terminal.

41. A computer program product stored on a computer usable medium, comprising readable program for causing a processing means in an IP network, to control the execution of the steps of claim 25.

42. The computer program product stored on a computer usable medium, comprising readable program for causing a processing means within a server and/or a router in an IP network according to claim 41, wherein the processing means also is located within a Radio Network Controller, proxy, or terminal.

* * * * *